No. 746,686. PATENTED DEC. 15, 1903.
E. B. DENNISON.
SAW.
APPLICATION FILED AUG. 11, 1903.
NO MODEL.
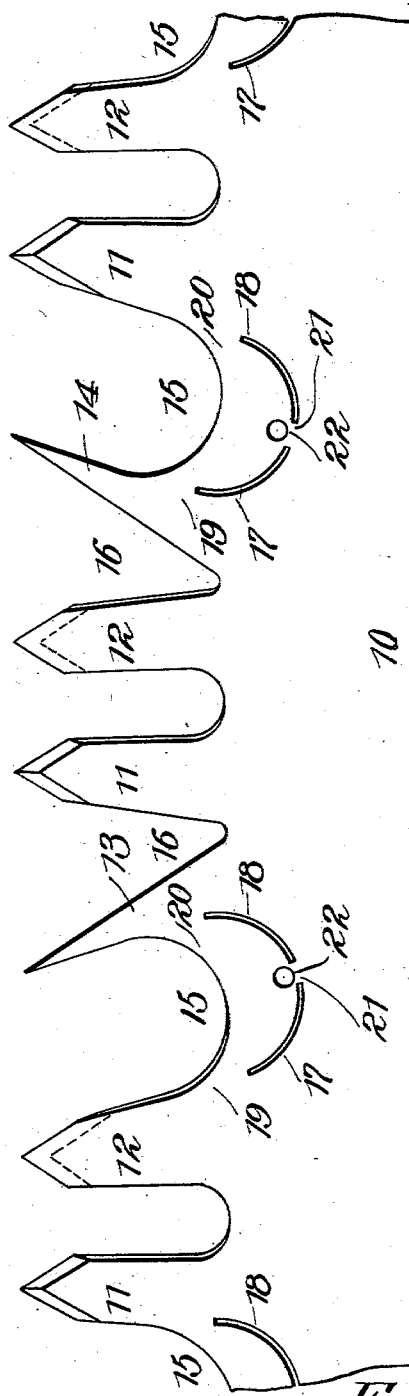
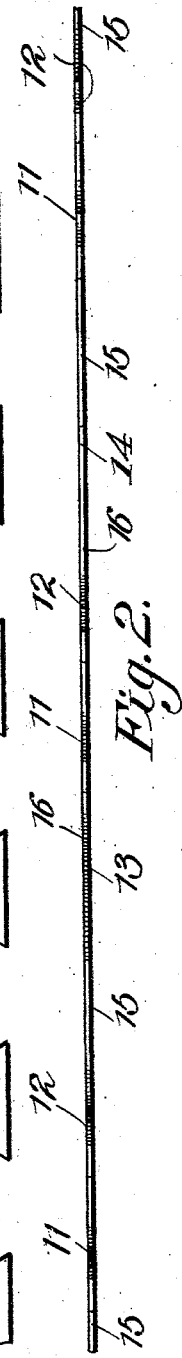
Witnesses
E. F. Stewart
Jno. E. Parker
E. B. Dennison, Inventor.
by C. A. Snow & Co.
Attorneys No. 746,686. Patented December 15, 1903.

UNITED STATES PATENT OFFICE.

EDWIN BENTON DENNISON, OF EUREKA, CALIFORNIA.

SAW.

SPECIFICATION forming part of Letters Patent No. 746,686, dated December 15, 1903.

Application filed August 11, 1903. Serial No. 169,145. (No model.)

*To all whom it may concern:*

Be it known that I, EDWIN BENTON DENNISON, a citizen of the United States, residing at Eureka, in the county of Humboldt and State of California, have invented a new and useful Improved Saw, of which the following is a specification.

This invention relates to saws, more particularly to crosscut-saws, and has for its object to improve the construction and form of the teeth and also facilitate the "gumming" or renewing process; and the invention consists in certain novel features of construction, as hereinafter shown and described, and specified in the claims.

In the drawings illustrative of the invention, in which corresponding parts are denoted by like designating characters, Figure 1 is a side view of a section of a saw embodying the improved construction. Fig. 2 is an edge view of the same.

The improved construction may be embodied in connection with several forms of saw-teeth, but is more particularly applicable to the class of saws known as "drag-saws," generally operated by two persons, and for the purpose of illustration is shown applied to a section of a saw of this class, the body of the saw being indicated at 10. The cutting-teeth are arranged in pairs 11 12, each pair spaced apart and with drag or "clearing" teeth 13 14 between the pairs. The clearing-teeth are arranged in relatively close proximity at their roots to each alternate pair of the cutting-teeth and inclined away from such closely-associated teeth and inclined toward but spaced from said remaining alternately-disposed cutting-teeth. By this means relatively large "gullets" 15 will be formed between said clearing-teeth, and one of said cutting-teeth on one side, with substantially parallel side and V-shaped gullets 16, will be formed between the opposite side of said clearing-teeth and the adjacent cutting-teeth, as shown. By this simple means the clearing-teeth act in both directions, as each alternate tooth is hooked in the opposite direction from the remainder, so that one half the teeth act when the saw is moved in one direction and the remaining half when the saw is moved in the opposite direction. By this arrangement it will not be necessary to swage the clearing-teeth, as the double action will render this unnecessary. The V shape of the gullets in the rear of the clearing-teeth enables them to very readily clear themselves from sawdust and effectually prevents clogging.

Formed in the body of the saw and spaced from the bottoms of the gullets 15 and conforming in contour thereto are curved clefts 17 18, separated at their outer ends from the gullets by solid portions 19 20 of the saw material and the inner ends separated by a solid portion 21, the latter being of relatively small area to readily break when the solid portions 19 20 are filed asunder. An aperture 22 is formed through the material opposite the solid portion 21 to receive a file end or other implement to assist in breaking the portion 21. By this simple arrangement when the saw is to be "gummed" it is only necessary to sever the relatively small solid portions 19 20 and break out the portion thereby released by inserting a suitable implement in the aperture 22 and employing it as a lever. This greatly facilitates the labor of gumming the saws, and likewise saves valuable time. The gumming may thus be accomplished very quickly and by persons not otherwise skilled, as it is only necessary to file through the portions 19 20 and break out the released portion. The presence of the clefts and aperture does not weaken the saw or render it liable to fracture and will not add materially to the expense.

In felling-saws which are used horizontally there is always an accumulation of sawdust in the kerf at a point to the rear of the saw. This materially interferes with the operation of the saw and its removal from the kerf. To obviate this, I form recesses 30 in the rear edge of the saw, the edges of the recesses being in the form of teeth that will engage the sawdust and feed the same from the kerf.

Having thus described my invention, what I claim is—

1. A saw the teeth whereof are divided by gullets and having clefts conforming in contour to the bottoms of the gullets and spaced therefrom, the outer ends of the clefts separated from the gullet area by solid portions of the saw material, and the adjacent inner ends of the clefts separated by a breakable section of the saw material, and with an aperture between said clefts and gullets, substantially as described.

2. A saw the teeth whereof are divided by gullets and having clefts conforming in contour to the bottoms of the gullets and spaced therefrom, the outer ends of the clefts separated from the gullet area by solid portions of the saw material, and the adjacent inner ends of the clefts separated by a breakable section of the saw material, and with an aperture between the solid portion separating said clefts and the bottom of the gullet, substantially as described.

In testimony that I claim the foregoing as my own I have hereto affixed my signature in the presence of two witnesses.

EDWIN BENTON DENNISON.

Witnesses:
GEORGE W. RAGER,
ROBERT B. MILLER.